US012131736B2

(12) United States Patent
Goodsitt et al.

(10) Patent No.: US 12,131,736 B2
(45) Date of Patent: Oct. 29, 2024

(54) CONTEXT-BASED DEACTIVATION OF A RECORDING DEVICE

(71) Applicant: Capital One Services, LLC, McLean, VA (US)

(72) Inventors: Jeremy Goodsitt, Champaign, IL (US);
Galen Rafferty, Mahomet, IL (US);
Samuel Sharpe, Cambridge, MA (US);
Grant Eden, Menlo Park, CA (US);
Austin Walters, Savoy, IL (US); Anh Truong, Champaign, IL (US);
Christopher Wallace, Rochester, NY (US)

(73) Assignee: Capital One Services, LLC, McLean, VA (US)

( * ) Notice: Subject to any disclaimer, the term of this patent is extended or adjusted under 35 U.S.C. 154(b) by 302 days.

(21) Appl. No.: 17/810,719

(22) Filed: Jul. 5, 2022

(65) Prior Publication Data
US 2024/0013781 A1 Jan. 11, 2024

(51) Int. Cl.
*G10L 15/22* (2006.01)
*G06F 9/451* (2018.01)
*G10L 15/18* (2013.01)
*G10L 15/08* (2006.01)

(52) U.S. Cl.
CPC .............. *G10L 15/22* (2013.01); *G06F 9/453* (2018.02); *G10L 15/18* (2013.01); *G10L 2015/088* (2013.01); *G10L 2015/223* (2013.01)

(58) Field of Classification Search
CPC .......... G10L 15/22; G10L 15/18; G06F 9/453
See application file for complete search history.

(56) References Cited

U.S. PATENT DOCUMENTS

2014/0157312 A1* 6/2014 Williams .......... H04N 21/41265
725/39
2019/0019077 A1* 1/2019 Griffin ................... G06N 5/041

\* cited by examiner

Primary Examiner — Ibrahim Siddo
(74) Attorney, Agent, or Firm — Harrity & Harrity, LLP

(57) ABSTRACT

In some implementations, a recording device may obtain a settings configuration associated with deactivating an audio recording function or an audio processing function of the recording device, wherein the settings configuration indicates one or more deactivation events. The recording device may obtain first audio content associated with the recording device for identifying audio prompts associated with causing the recording device to perform one or more actions. The recording device may detect a deactivation event of the one or more deactivation events. The recording device may refrain from obtaining audio content based on detecting the deactivation event and until an activation event is detected. The recording device may obtain second audio content associated with the recording device based on detecting the activation event.

20 Claims, 7 Drawing Sheets

CONTEXT-BASED DEACTIVATION OF A RECORDING DEVICE

BACKGROUND

A recording device, such as an interactive voice response (IVR) system, a virtual assistant, a virtual agent, a digital assistant, and/or an intelligent personal assistant, among other examples, may communicate with a user regarding one or more topics, issues, and/or the like. The recording device generates voice data, text data, and/or video data, among other examples, to converse with the user. For example, the recording device may include a software agent that can perform various tasks or services based on commands and/or questions provided by a user. For example, the user may ask the virtual assistant questions (e.g., to search for information) and/or the user may request that the virtual assistant perform commands (e.g., to control home automation devices and/or media playback), among other examples. Virtual assistants are typically implemented as voice assistants that are able to interpret human speech and respond via synthesized voices or as chatbots that allow users to ask questions, retrieve information, and/or perform tasks via a text-based interface.

SUMMARY

Some implementations described herein relate to a system for context-based deactivation of a recording device. The system may include one or more memories and one or more processors coupled to the one or more memories. The one or more processors may be configured to obtain first audio content associated with the recording device for identifying audio prompts associated with causing the recording device to perform one or more actions. The one or more processors may be configured to detect a deactivation event based on at least one of the first audio content, a current time, or a settings configuration associated with the recording device. The one or more processors may be configured to refrain from obtaining audio content associated with the recording device based on detecting the deactivation event and until an activation event is detected, wherein refraining from obtaining audio content includes at least one of refraining from storing any audio content until the activation event is detected or refraining from processing any audio content until the activation event is detected. The one or more processors may be configured to obtain second audio content associated with the recording device based on detecting the activation event.

Some implementations described herein relate to a method for context-based deactivation of a recording device. The method may include obtaining, by the recording device, a settings configuration associated with deactivating an audio recording function or an audio processing function of the recording device, wherein the settings configuration indicates one or more deactivation events. The method may include obtaining, by the recording device, first audio content associated with the recording device for identifying audio prompts associated with causing the recording device to perform one or more actions. The method may include detecting, by the recording device, a deactivation event of the one or more deactivation events. The method may include refraining, by the recording device, from obtaining audio content based on detecting the deactivation event and until an activation event is detected. The method may include obtaining, by the recording device, second audio content associated with the recording device based on detecting the activation event.

Some implementations described herein relate to a non-transitory computer-readable medium that stores a set of instructions for a recording device. The set of instructions, when executed by one or more processors of the recording device, may cause the recording device to obtain a settings configuration associated with deactivating an audio recording function or an audio processing function of the recording device, wherein the settings configuration indicates one or more deactivation events. The set of instructions, when executed by one or more processors of the recording device, may cause the recording device to obtain first audio content associated with the recording device for identifying audio prompts associated with causing the recording device to perform one or more actions. The set of instructions, when executed by one or more processors of the recording device, may cause the recording device to detect a deactivation event of the one or more deactivation events. The set of instructions, when executed by one or more processors of the recording device, may cause the recording device to refrain from obtaining audio content based on detecting the deactivation event and until an activation event is detected. The set of instructions, when executed by one or more processors of the recording device, may cause the recording device to detect the activation event, wherein the activation event is associated with the deactivation event. The set of instructions, when executed by one or more processors of the recording device, may cause the recording device to obtain second audio content associated with the recording device based on detecting the activation event.

DETAILED DESCRIPTION

Figure 1A:
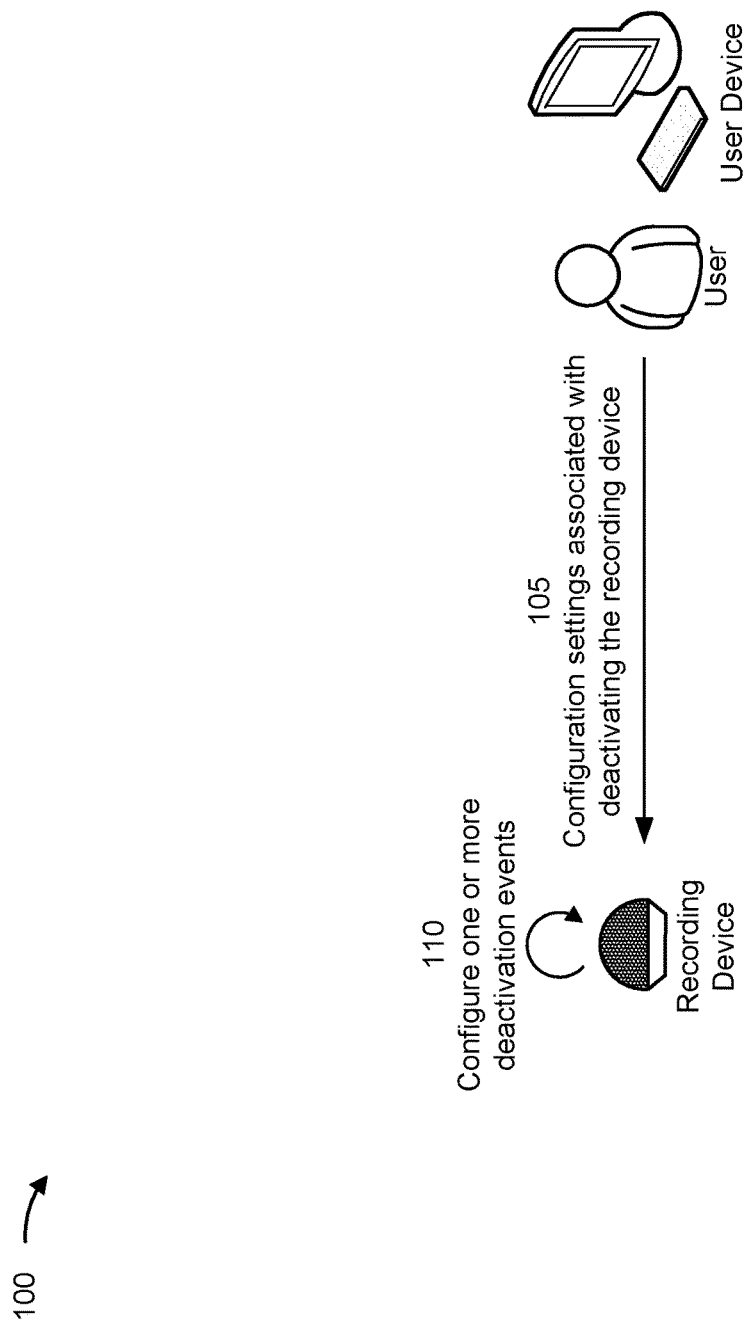
FIGS. 1A-1D are diagrams of an example associated with context-based deactivation of a recording device, in accordance with some embodiments of the present disclosure.

The following detailed description of example implementations refers to the accompanying drawings. The same reference numbers in different drawings may identify the same or similar elements.

Automated tasks or services are becoming increasingly prevalent in everyday life. To facilitate such automated tasks or services, a recording device may be utilized to record and/or process words spoken by a user to identify a task or service that the user wishes to be performed. For example, the recording device may be a user device (e.g., with an application executing on the user device associated with performing automated tasks or services) or the recording device may be a standalone device. The recording device may actively "listen" (e.g., record audio content and/or process the audio content to identify prompts or other trigger words) to audio content (e.g., spoken words) within a vicinity of the recording device. For example, the recording device may listen for a prompt (e.g., "Hey [device]") that indicates a user is requesting that the recording device perform a task or service. The recording device may be an always-on voice assistant that receives voice commands from a user and performs functions based on the voice commands. The recording device may then record and/or process words spoken by the user to identify the task or service. The recording device may perform the task or service based on identifying the task or service (e.g., by processing the words spoken by the user).

However, to enable the recording device to perform tasks or services, the recording device may actively listen (e.g., record audio content and/or process the audio content to identify prompts or other trigger words) so that a user can simply prompt the recording device to perform tasks or services by speaking (e.g., without interacting with the recording device or another device). As a result, the recording device may record, store, and/or process audio (e.g., words) that is output in a vicinity of the recording device (e.g., spoken by a user or output by another device). This may result in the recording device recording, storing, and/or processing sensitive information, such as confidential information or other sensitive information (e.g., a social security number, financial account numbers, among other examples). For example, a recording device may be located in a workplace setting (e.g., a home workplace or in an office building). One or more users may discuss information associated with a business that is confidential to the business. In an attempt to identify prompts or other trigger words, the recording device may record, store, and/or process the information that is confidential to the business.

A malicious actor may be enabled to obtain the sensitive information by accessing a storage medium associated with the recording device or by intercepting a communication (e.g., including the sensitive information) between the recording device and another device, such as a server device. As a result, the recording device may introduce a risk of unintended disclosure of sensitive information to malicious actors. In some cases, a user may simply disconnect or turn off the recording device to prevent the recording device from recording or storing audio content at certain times. However, this requires the user to remember to turn off the recording device prior to the sensitive information being output (e.g., a user may forget to turn off the recording device and/or the user may be unable to predict when sensitive information will be discussed). Additionally, this requires the user to remember to turn on the recording device to enable the recording device to perform tasks or services. Therefore, current approaches for preventing such recording devices from accessing sensitive information are inefficient and may still introduce a risk of unintended disclosure of sensitive information.

Some techniques described herein enable context-based deactivation of a recording device. For example, the recording device may obtain first audio content associated with the recording device for identifying audio prompts associated with causing the recording device to perform one or more actions. The recording device may detect a deactivation event based on the first audio content, a current time, and/or a settings configuration associated with the recording device, among other examples. The recording device may refrain from obtaining (e.g., recording and/or storing) audio content associated with the recording device based on detecting the deactivation event and until an activation event is detected. The recording device may obtain (e.g., store, record, and/or process) second audio content associated with the recording device based on detecting the activation event.

For example, a deactivation event may be associated with one or more time periods during which the recording device is to be deactivated, one or more keywords, and/or one or more categories associated with a conversation, among other examples. For example, the recording device may process (e.g., using a natural language processing (NLP) technique or another technique), audio content to identify one or more words or one or more phrases associated with the audio content. The recording device may determine that the one or more words or the one or more phrases are associated with one or more keywords or one or more categories associated with the deactivation event. The recording device may refrain from obtaining (e.g., recording, processing, and/or storing) audio content based on detecting the deactivation event.

The activation event may be associated with an amount of time from a time at which the deactivation event is detected. As another example, the activation event may be associated with activity or actions performed by another device. For example, the activation event may be associated with an activity on a user device ending (e.g., a video chat program closing, thereby indicating that the user is no longer on a call). As another example, the activation event may be based on a current time (e.g., after 5:00 PM the recording device may activate and resume obtaining audio content).

As a result, a risk of a disclosure of sensitive information caused by the recording device recording and/or storing the sensitive information may be mitigated. Additionally, the context-based approach described herein provides a more efficient technique for stopping and starting a recording or listening function of the recording device. For example, the recording device may be enabled to automatically stop recording or listening (e.g., without user input that specifically indicates that the recording device is to stop recording or listening) based on detecting a deactivation event. Additionally, the recording device may be enabled to automatically resume recording or listening (e.g., without user input that specifically indicates that the recording device is to resume recording or listening) based on detecting an activation event. Therefore, a risk of a disclosure of sensitive information caused by the recording device recording and/or storing the sensitive information may be mitigated, and access to the tasks or services performed by the recording device may be improved (e.g., because the recording device may not stay in an "off" state indefinitely until the user turns the recording or listening function back on).

FIGS. 1A-1D are diagrams of an example 100 associated with context-based deactivation of a recording device. As shown in FIGS. 1A-1D, example 100 includes the recording device, and a user device. These devices are described in more detail in connection with FIGS. 2 and 3.

The recording device may be associated with functionality that includes obtaining (e.g., recording, storing, and/or processing) audio or voice commands from a user and performing functions based on the audio or voice commands. The recording device may be any device that actively records, stores, and/or processes audio for the purpose of identifying voice commands or prompts from a user. For example, the recording device may be, or may be associated with, an interactive voice response (IVR) system, a virtual assistant, a virtual agent, a digital assistant, and/or an intelligent personal assistant, among other examples. In some implementations, the recording device may be associated with an application (e.g., a virtual assistant application or program, among other examples) executing on the recording device that causes the recording device to provide virtual assistant functionality. The application may be associated with an audio recording function and/or an audio processing function of the recording device. In some implementations, the recording device may be, may be associated with, or may be included in, the user device. In other implementations, the recording device may be, or may be included in, a device that is separate from the user device.

As shown in FIG. 1A, the recording device may be configured to perform one or more actions. For example, as shown by reference number 105, the recording device may obtain a settings configuration associated with the recording device. For example, the recording device may receive the settings configuration from another device, such as the user device or server device (not shown in FIG. 1A). As another example, a user may input the settings configuration via a user interface associated with the recording device. The settings configuration may be associated with deactivating a listening function (e.g., an audio recording function and/or an audio processing function) of the recording device.

The settings configuration may indicate one or more deactivation events. As used herein, a "deactivation event" may refer to an event that, when detected by the recording device, triggers the recording device to refrain from obtaining (e.g., recording, storing, and/or processing) audio and/or video content. For example, the recording device may provide a set of deactivation events as configuration options. The user may select one or more deactivation events, from the set of deactivation events, to be configured for the recording device.

For example, the settings configuration may indicate one or more time periods during which the recording device is to be deactivated (e.g., indicating that the recording device is to be deactivated from 9:00 AM to 5:00 PM). For example, the user may input the one or more time periods as part of providing the settings configuration. As another example, the settings configuration may indicate one or more keywords associated with a deactivation event. For example, a keyword may be a trigger or prompt to indicate to the recording device that a deactivation event is occurring. For example, a keyword may be an audio command, such as "stop recording," among other examples. As another example, a keyword may be a word that indicates sensitive information. For example, a keyword may be a word that indicates that a conversation is associated with sensitive information or confidential information. The keyword may be associated with financial terms (e.g., "bank," "account," "account number," "card number," and/or "routing number," among other examples), personally identifiable information terms (e.g., "address," "social security," "passport," and/or "license number," among other examples), and/or other terms that indicate sensitive or confidential information (e.g., "client," "project," "confidential," "secure," and/or "private," among other examples). In some implementations, the recording device may provide a set of keywords as configuration options. The user may select one or more keywords, from the set of keywords, to be configured for the recording device. Additionally, or alternatively, the user may input one or more keywords as part of providing the settings configuration.

As another example, the settings configuration may indicate one or more categories associated with a deactivation event. For example, a category may be associated with a type or category of audio content that the recording device is to refrain from recording, storing, and/or processing. For example, a category may include financial information, workplace or job information, client information, and/or work-related calls or conversations, among other examples. For example, as described in more detail elsewhere herein, if a category is indicated by the settings configuration, the recording device may analyze audio content to determine if the audio content is associated with the category. If the audio content is associated with the category, then the recording device may determine that the deactivation event is detected. In some implementations, the recording device may be associated with a machine learning model that is trained to detect a category associated with audio content.

In some implementations, a category may be associated with one or more keywords. For example, if a category is indicated by the settings configuration, the recording device may obtain and/or configure (e.g., from a memory associated with the recording device or from a server device) one or more keywords that have been associated with the category (e.g., that have been previously associated with the category via an equipment manufacturer configuration or a configuration provided by an entity that produces and/or maintains the recording device). In some implementations, the recording device may provide a set of categories as configuration options. The user may select one or more categories, from the set of categories, to be configured for the recording device. Additionally, or alternatively, the user may input one or more categories as part of providing the settings configuration.

In some implementations, the settings configuration may provide permission for the recording device to access information associated with and/or communicate with another device, such as the user device. For example, the user may provide permission for the recording device to monitor activity occurring on the user device to facilitate the recording device detecting one or more deactivation events. For example, the settings configuration may indicate that a deactivation event is associated with activity occurring on the user device, such as a certain application or program (e.g., a voice/video call application, a virtual desktop application, a cloud desktop, and/or other applications or programs) being open or executing on the user device, among other examples. The settings configurations may indicate the deactivation event and may provide permission for the recording device to obtain an indication of activity occurring on the user device to enable the recording device to detect the deactivation event.

In some implementations, the settings configuration may provide permission for the recording device to access information associated with an account that is associated with the user. For example, the settings configuration may provide permission for the recording device to access calendar information associated with the user via the account (e.g., an email account or another account). The recording device may determine (e.g., based on the calendar information) when meetings or calls are scheduled for the user. For example, a deactivation event may be associated with the recording device deactivating during any meetings or calls associated with the user. As another example, the recording device may determine a schedule (e.g., a workday schedule) associated with the user based on the calendar information. For example, a deactivation event may be associated with the recording device deactivating during working hours as indicated by the schedule.

In some implementations, the recording device may analyze audio activity associated with the recording device to determine a schedule associated with one or more time periods during which the recording device is to be deactivated. For example, the recording device may analyze periods of time during which audio activity typically occurs. The recording device may analyze time periods during which the one or more categories or keywords (e.g., associated with deactivation events and/or that indicate sensitive or confidential information) are typically or most often detected by the recording device. The recording device may determine that the recording device is to be deactivated during the one or more time periods. For example, the one or more time periods may be associated with a schedule or working hours of a user (e.g., where the user may often be discussing confidential or sensitive information). The recording device may be enabled to recognize the time periods (e.g., without user input) and may automatically deactivate during these time periods (e.g., as explained in more detail below). This may improve security associated with the user by ensuring that the recording device does not record, store, and/or process audio content during time periods in which the user typically discusses confidential or sensitive information.

In some implementations, the recording device may determine a deactivation event based on previous deactivations triggered by the user. For example, the recording device may input information associated with previous deactivations of the recording device triggered by the user into a machine learning model. For example, the information may include a time associated with a deactivation, audio content obtained prior to a deactivation, and/or activity that was occurring on the user device before and/or after a deactivation, among other examples. In this way, the recording device may learn patterns or triggers associated with the user trigger a deactivation of the recording device. The recording device may configure one or more deactivation events based on the patterns or triggers, thereby enabling the recording device to automatically deactivate in similar scenarios without requiring user input.

As shown by reference number 110, the recording device may configure itself with one or more deactivation events (e.g., as indicated by the settings configuration or based on indications of deactivation events previously stored by the recording device). For example, the recording device may configure itself to monitor for and/or detect the one or more deactivation events. In some implementations, the recording device may establish a communication connection (e.g., via a wireless network or a wired network) with another device, such as the user device or another recording device, to facilitate the detection of the one or more deactivation events, as explained in more detail elsewhere herein.

Figure 1B:
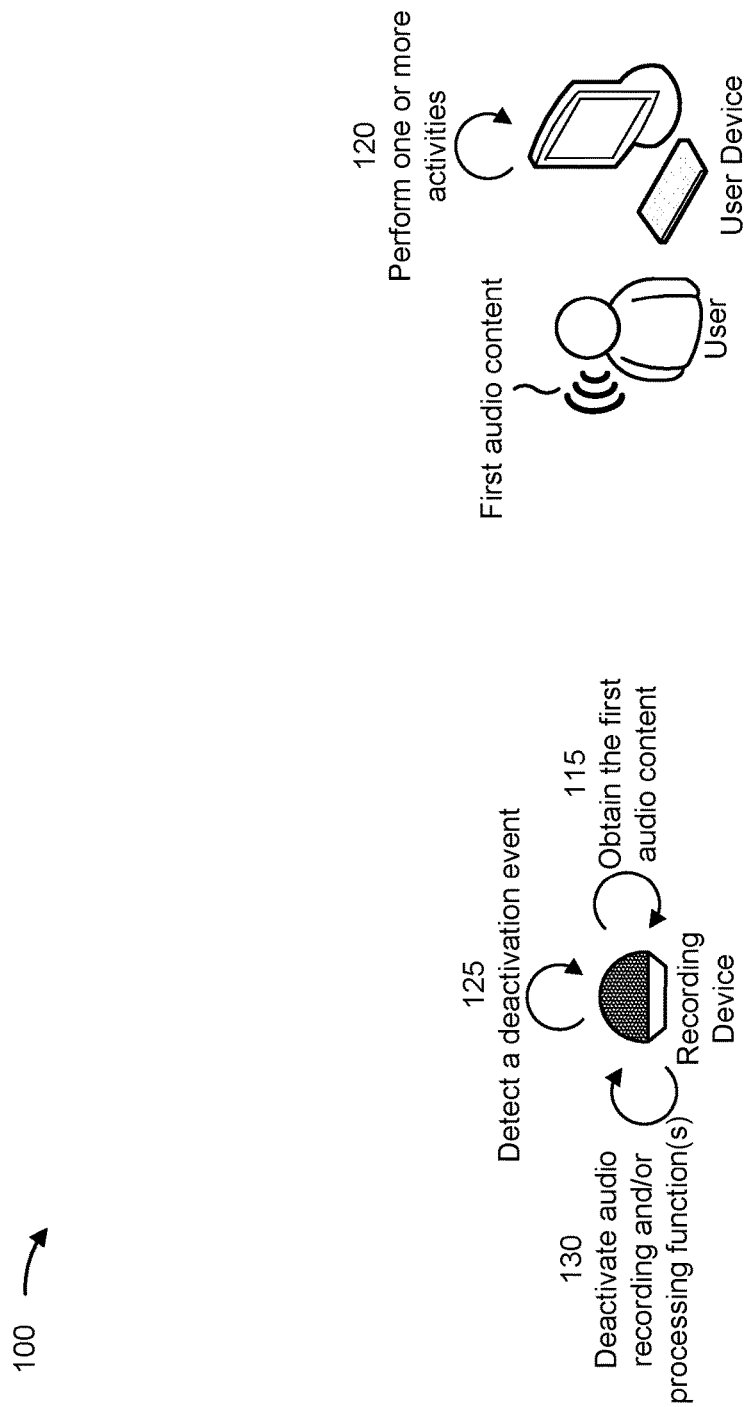

As shown in FIG. 1B, first audio content may be output in a vicinity of the recording device. For example, the user may speak one or more words. Additionally, or alternatively, the user device may output the audio content. As shown by reference number 115, the recording device may obtain the first audio content. The recording device obtaining audio content may include the recording device recording, storing, and/or processing the audio content. For example, the recording device may obtain the first audio content for identifying audio prompts or commands associated with causing the recording device to perform one or more actions. For example, the recording device may process or analyze the first audio content to determine whether audio prompts or commands (e.g., associated with causing the recording device to perform one or more actions) are included in the first audio content. Additionally, the recording device may process or analyze the first audio content to determine whether a deactivation event is detected.

In some implementations, as shown by reference number 120, the user device may perform one or more activities. For example, the user device may execute or run an application or a program. For example, the user may open the application or program via the user device. The application or program may be a video conferencing program, a video call program, a gaming program, a chat program, and/or another program that is associated with the user speaking. As another example, the user may log in to a virtual desktop or a virtual machine associated with the user device. For example, the virtual desktop or the virtual machine may be associated with the user performing tasks for an entity, such as performing work-related tasks via the user device (e.g., for an employer).

The activity may be associated with a deactivation event. For example, the recording device may be configured (e.g., via the settings configuration or another configuration) to not record and/or store audio content when certain activities are being performed by the user device. For example, the recording device may not record and/or store audio content when a program that is associated with the user speaking (e.g., a video conferencing program or a video call program) is open and/or executing on the user device. As another example, the recording device may not record and/or store audio content when a program (e.g., a virtual desktop program) that is associated with the user performing work-related tasks (e.g., for an employer or client) is open and/or executing on the user device.

The recording device may obtain an indication of an activity associated with the user device. For example, the user device may transmit, and the recording device may receive, an indication of the activity. For example, the recording device may transmit, and the user device may receive, an indication of activities (e.g., programs, applications, or other activities) that are associated with deactivation events. As another example, the user may input, to the user device, an indication of the activities (e.g., programs, applications, or other activities) that are associated with deactivation events. The user device may transmit the indication of the activity based on the activity being indicated as being associated with a deactivation event. As another example, the recording device may monitor activity associated with the user device. For example, the user device may periodically transmit indications of activity associated with the user device.

As shown by reference number 125, the recording device may detect a deactivation event. The recording device may detect the deactivation event based on the settings configuration. For example, the recording device may be configured with one or more deactivation events via the settings configuration, as explained in more detail elsewhere herein. In some implementations, the recording device may detect the deactivation event based on a current time. For example, the recording device may determine that a current time is within a time period during which the recording device is to be deactivated. For example, the recording device may be configured to be deactivated during a certain time period (e.g., from 9:00 AM to 12:00 PM and from 1:00 PM to 5:00 PM). The recording device may determine or detect that the current time is within the certain time period. As another example, the recording device may detect that the current time is included in the one or more time periods (e.g., that are determined by the recording device, as described in more detail elsewhere herein).

As another example, the recording device may detect the deactivation event based on the first audio content. For example, the recording device may process (e.g., using an NLP technique or another technique) the first audio content to identify one or more words or one or more phrases associated with the first audio content. The recording device may determine that the one or more words or the one or more phrases are associated with one or more keywords or one or more categories associated with the deactivation event. For example, the recording device may detect, via a machine learning model that is trained to detect the one or more categories of audio content, that the first audio content is associated with at least one category of the one or more categories of audio content. The machine learning model may be an audio detection model or an NLP machine learning model.

For example, the recording device may identify one or more words or one or more phrases associated with the first audio content. The recording device may determine whether the one or more words or one or more phrases match, or are similar to, the one or more keywords associated with the deactivation event(s) (e.g., as indicated by the settings configuration). For example, the recording device may determine a degree of similarity between the one or more words or one or more phrases and a keyword (e.g., "banking" may have a high degree of similarity to a keyword "bank"). For example, a machine learning model may output a similarity score associated with a word or phrase included in the first audio content. If the similarity score satisfies a threshold, then the recording device may determine that the deactivation event is detected. If the similarity score does not satisfy the threshold, then the recording device may determine that the deactivation event is not detected (e.g., at least for that particular word or phrase).

Additionally, or alternatively, a machine learning model may output one or more categories associated with the first audio content. For example, the recording device (e.g., via the machine learning model) may determine the one or more categories associated with the first audio content based on words or phrases included in the first audio content. For example, if the first audio content includes words such as "account," "credit card," and/or "bank," then the recording device may determine that a category associated with the first audio content is finance. As another example, if the first audio content includes words such as "client," "business," "work," among other examples, then the recording device may determine that a category associated with the first audio content is work or business. In some implementations, the machine learning model may be trained based on audio activity associated with the user. For example, the machine learning model may be trained to recognize a particular entity name, user's name, or client name associated with the user (e.g., to recognize a name of a client associated with the user and/or a name of an employer associated with the user). The recording device may detect the deactivation event based on identifying the particular entity name, user's name, and/or client name, among other examples, associated with the user.

In some implementations, the recording device may detect a word, phrase, or category (e.g., in audio content obtained by the recording device) that is associated with a calendar event, such as "meeting," and/or "call," "thanks for joining," among other examples. For example, a machine learning model may be trained (e.g., using historical audio content that is associated with calendar events) to detect when a calendar event is occurring via audio content that is associated with the calendar event. The recording device may detect a deactivation device based on detecting the word, phrase, or category that is associated with a calendar event.

As another example, the recording device may detect the deactivation event based on the activity associated with the user device. For example, the recording device may obtain the indication of the activity associated with the user device. The recording device may determine that the activity is associated with a deactivation event.

As shown by reference number 130, the recording device may deactivate an audio recording function and/or an audio processing function of the recording device based on detecting the deactivation event. In some implementations, the recording device may deactivate a video recording function (e.g., if configured) based on detecting the deactivation event. For example, the recording device may modify a configuration to cause the recording device to refrain from obtaining audio content, as explained in more detail elsewhere herein.

Figure 1C:
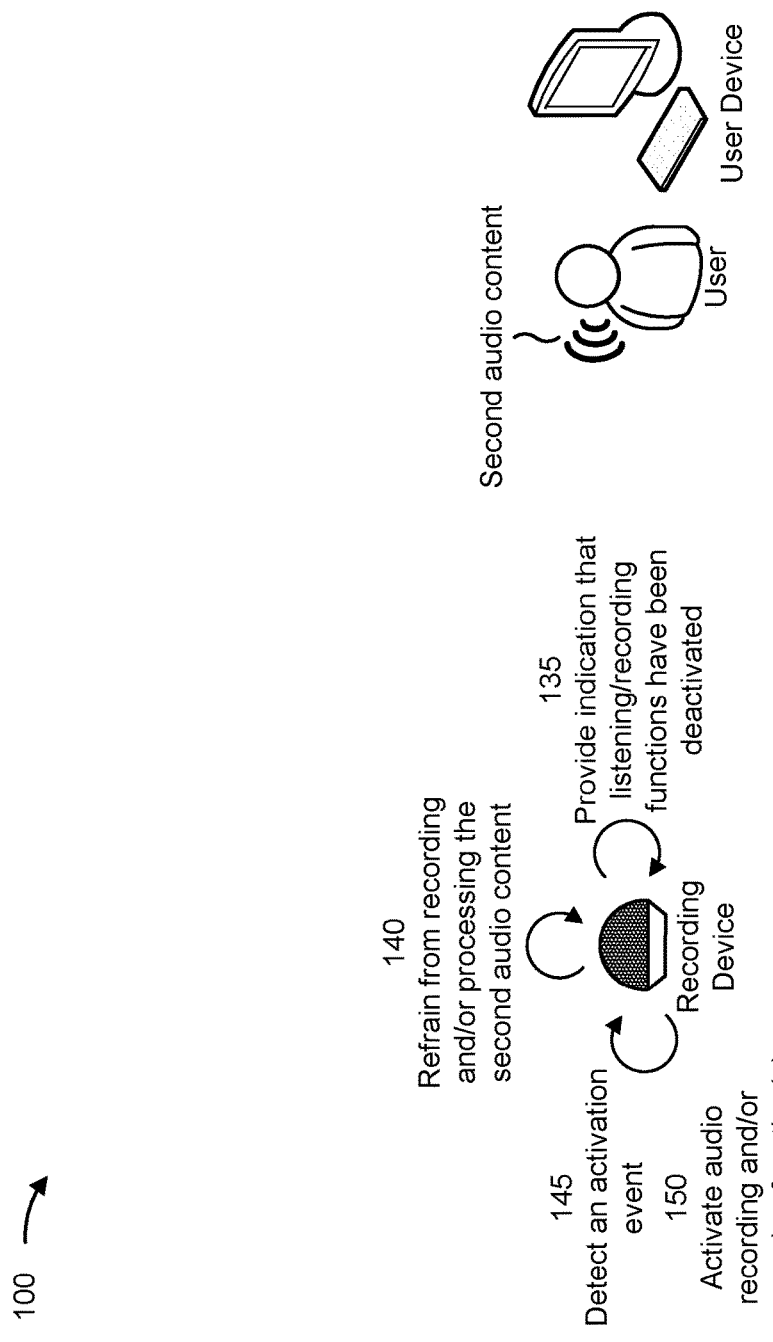

As shown in FIG. 1C, and by reference number 135, the recording device may provide or output an indication that the listening or recording functions of the recording device have been deactivated. For example, the recording device may output an audible indication that the listening or recording functions of the recording device have been deactivated (e.g., "I am no longer listening for audio commands" or "I have detected a deactivation event," among other examples). As another example, the recording device may transmit an indication (e.g., a text notification, an email notification, or another indication) that the listening or recording functions of the recording device have been deactivated to one or more devices, such as the user device. In other words, the recording device may output the indication to notify the user that the recording device has stopped listening and/or recording. This may enable the user to perform an action if the recording device has incorrectly detected a deactivation event. In this way, the audio recording and/or audio functions of the recording device may be resumed quicker after the recording device has incorrectly detected a deactivation event.

As shown in FIG. 1C, second audio content may be output (e.g., by one or more users or by another device) in the vicinity of the recording device (e.g., after the recording device detects the deactivation event and/or deactivates the listening or recording function). As shown by reference number 140, the recording device may refrain from recording and/or processing the second audio content (e.g., based on detecting the deactivation event). In other words, the recording device may refrain from obtaining audio content associated with the recording device based on detecting the deactivation event and until an activation event is detected. As used herein, refraining from obtaining audio content may include refraining from recording any audio content until the activation event is detected, refraining from storing any audio content until the activation event is detected, and/or refraining from processing any audio content until the activation event is detected. In this way, security associated with sensitive or confidential information that is included in the second audio content may be improved (e.g., because the second audio content is not recorded, stored, and/or processed by the recording device).

As shown by reference number 145, the recording device may detect an activation event. In some implementations, the activation event may be based at least in part on an amount of time from a time at which the deactivation event is detected. For example, the recording device may detect a deactivation event and may refrain from obtaining audio content for a certain amount of time (e.g., 30 minutes, 1 hour, 3 hours, or another amount of time).

In some implementations, the amount of time may be based on the deactivation event that is detected. For example, if a first deactivation event is detected, then the recording device may refrain from obtaining audio content for a first amount of time. If a second deactivation event is detected, then the recording device may refrain from obtaining audio content for a second amount of time. In other words, the recording device may stop listening to audio content for different amounts of time for different deactivation events. This may provide improved security for sensitive content because the amount of time for which the recording device is deactivated may be tailored to the deactivation event that triggered the deactivation of the recording device. For example, if the deactivation event is associated with work-related information or client information, then the amount of time may be longer (e.g., 1 hour or 3 hours) because work-related information or client information may be discussed for extended periods of time. If the deactivation event is associated with personal information, then the amount of time may be shorter (e.g., 30 minutes) because a user may not discuss personal information for extended periods of time. Additionally, this may enable the user to resume utilizing the recording device to perform tasks or services sooner in some cases (e.g., in cases where the deactivation event indicates that the amount of time for which the recording device is deactivated is shorter due to the nature of the deactivation event).

In some implementations, the activation event may be based on activity associated with the user device. For example, the activation event may be based on a change in the activity associated with the user device or on activity terminating on the user device. For example, if the deactivation event is associated with an application or program opening on the user device, then the activation event may be associated with the application or program closing on the user device. As another example, the activation event may be associated with the user device detecting no user activity for a certain amount of time. For example, the recording device may be located proximate to the user device (e.g., in the same room). A lack of activity on the user device may indicate that the user is no longer using the user device and/or is no longer in the vicinity of the user device. Therefore, the recording device may resume a listening function.

As another example, the activation event may be associated with activity associated with another recording device. For example, the recording device may be associated with one or more other recording devices. For example, the same account (e.g., associated with the user) may be linked to multiple recording devices. In some implementations, the recording device may detect activity associated with another recording device that is associated with the recording device. For example, the user may provide a voice command to the other recording device. This may indicate that the user is now in the vicinity of the other recording device (e.g., and not the recording device). Therefore, the activation event may be associated with the activity (e.g., based on detecting the activity associated with the other recording device, the recording device may detect the activation event).

As another example, the activation event may be associated with a user input to the recording device. The user input may be a tactile input (e.g., an audio input may not be used because the recording device is not currently obtaining audio content). For example, a user may press a button or provide an input to a user interface associated with the recording device. The user input may indicate that the recording device is to resume obtaining audio content.

As shown by reference number 150, the recording device may activate the audio recording function and/or the audio processing function of the recording device based on detecting the activation event. In some implementations, the recording device may activate a video recording function (e.g., if configured) based on detecting the activation event. For example, the recording device may modify a configuration to cause the recording device to resume obtaining audio content.

Figure 1D:
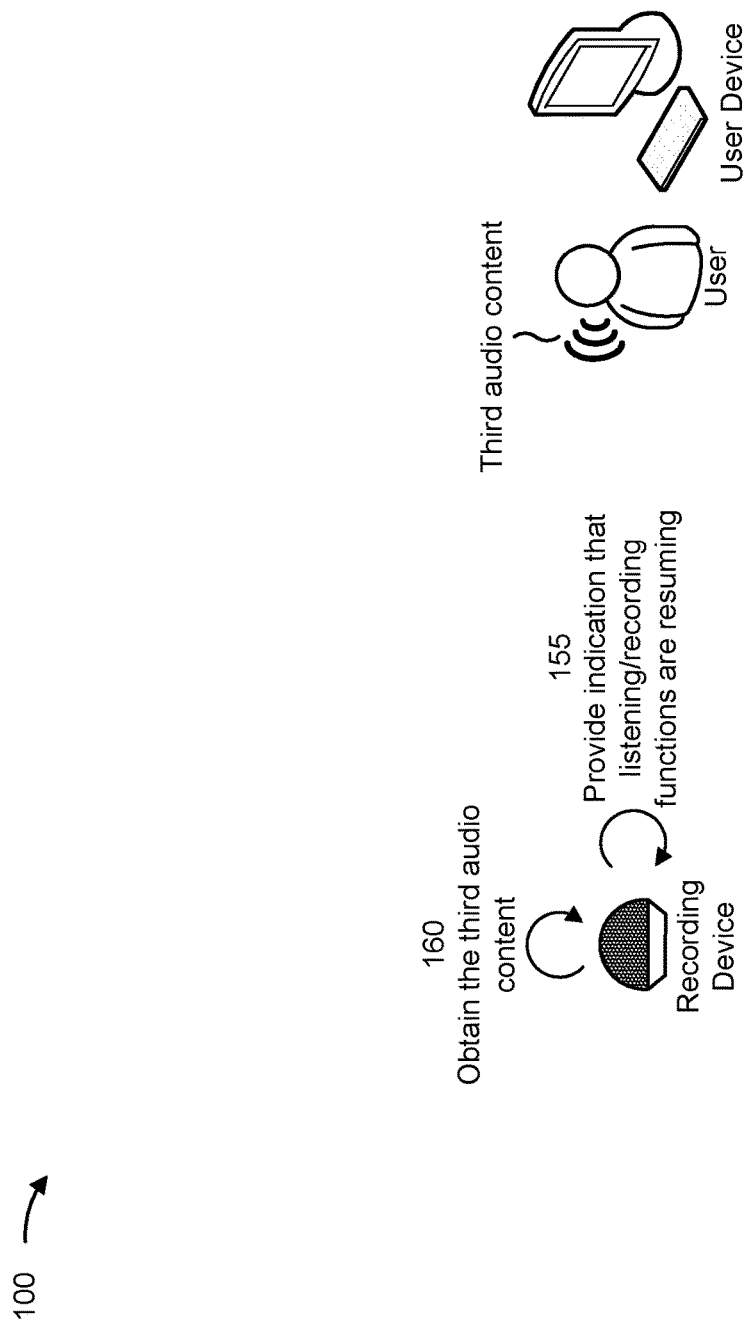

As shown in FIG. 1D, and by reference number 155, the recording device may provide or output an indication that the audio recording function and/or the audio processing function of the recording device has resumed function. For example, the recording device may provide an indication that the recording device is to resume obtaining audio content based on detecting the activation event and prior to resuming obtaining audio content. For example, the recording device may output an audible indication that the listening or recording functions of the recording device have been activated (e.g., "I am now listening for audio commands" or "I am resuming listening," among other examples).

As another example, the recording device may transmit an indication (e.g., a text notification, an email notification, or another indication) that the listening or recording functions of the recording device have been activated to one or more devices, such as the user device. In other words, the recording device may output the indication to notify the user that the recording device is to begin listening and/or recording. This may enable the user to perform an action if the recording device has incorrectly detected an activation event or if the amount of time associated with the activation event was not sufficient. In this way, the audio recording and/or audio functions of the recording device may be deactivated by the user more quickly, thereby reducing a likelihood that the recording device obtains sensitive or confidential information.

As shown in FIG. 1D, third audio content may be output in the vicinity of the recording device (e.g., by one or more users or devices). As shown by reference number 160, the recording device may obtain the third audio content. For example, the recording device may record, store, and/or process the third audio content. For example, the recording device may obtain the third audio content for identifying audio prompts or commands associated with causing the recording device to perform one or more actions. For example, the recording device may process or analyze the third audio content to determine whether audio prompts or commands (e.g., associated with causing the recording device to perform one or more actions) are included in the third audio content. Additionally, the recording device may process or analyze the third audio content to determine whether a deactivation event is detected (e.g., as explained in more detail elsewhere herein).

As indicated above, FIGS. 1A-1D are provided as an example. Other examples may differ from what is described with regard to FIGS. 1A-1D.

Figure 2:
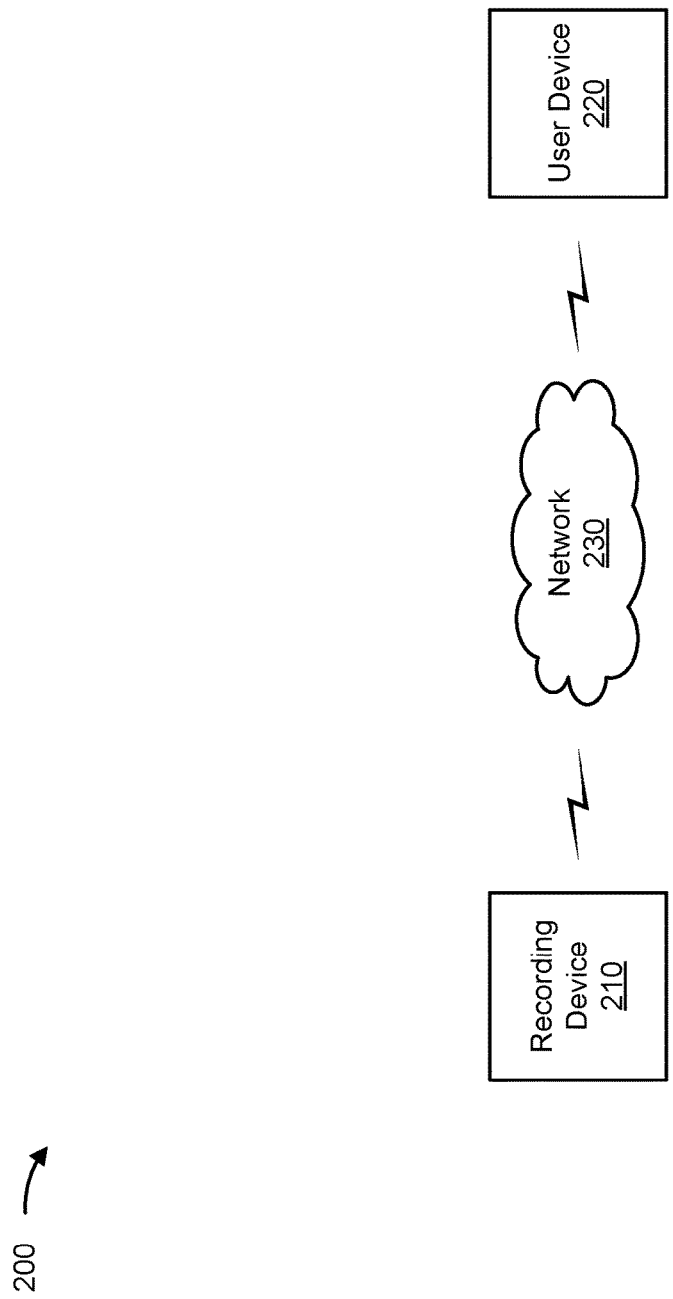
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a recording device 210, a user device 220, and a network 230. Devices of environment 200 may interconnect via wired connections, wireless connections, or a combination of wired and wireless connections.

The recording device 210 includes one or more devices capable of receiving, generating, storing, processing, and/or providing information associated with context-based deactivation of the recording device 210, as described elsewhere herein. For example, the recording device 210 may include one or more devices capable of receiving, storing, processing, generating, and/or providing information associated with a set of voice commands. For example, recording device 210 may be an always-on voice assistant that receives voice commands from a user and performs functions based on the voice commands. In some implementations, the recording device 210 may be a video assistant that processes gesture based commands, and/or performs object recognition (e.g., in addition to processing audio content). The recording device 210 may include a communication device and/or a computing device. For example, the recording device 210 may include, or be included in, a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the recording device 210 may be a device (e.g., the user device 220 or another device) executing software or an application associated with providing a virtual assistant functionality.

The user device 220 includes one or more devices capable of receiving, generating, storing, processing, and/or providing information associated with context-based deactivation of a recording device (e.g., the recording device 210), as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
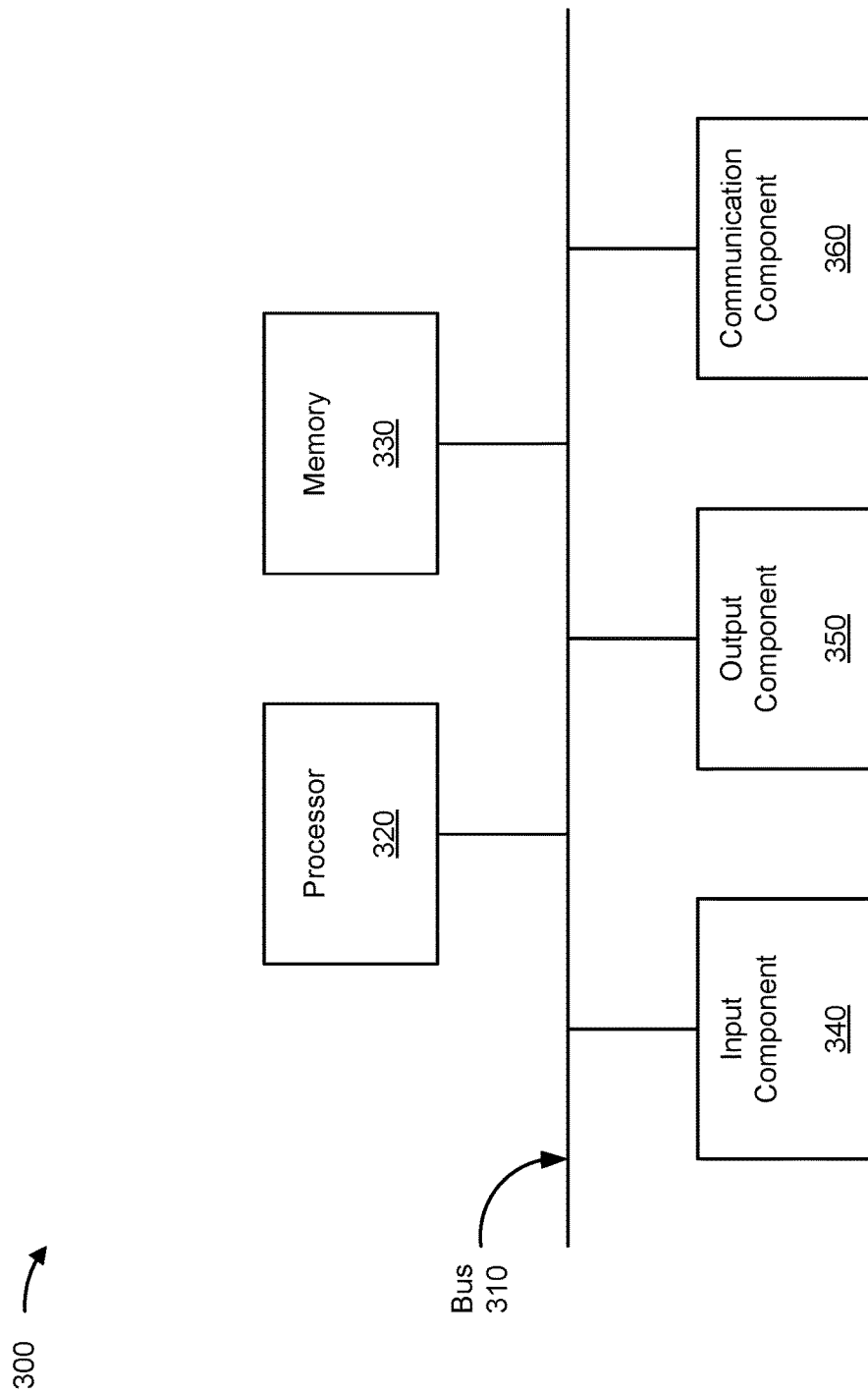
FIG. 3 is a diagram of example components of a device associated with context-based deactivation of a recording device, in accordance with some embodiments of the present disclosure.

FIG. 3 is a diagram of example components of a device 300 associated with context-based deactivation of a recording device. Device 300 may correspond to the recording device 210 and/or the user device 220. In some implementations, the recording device 210 and/or the user device 220 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
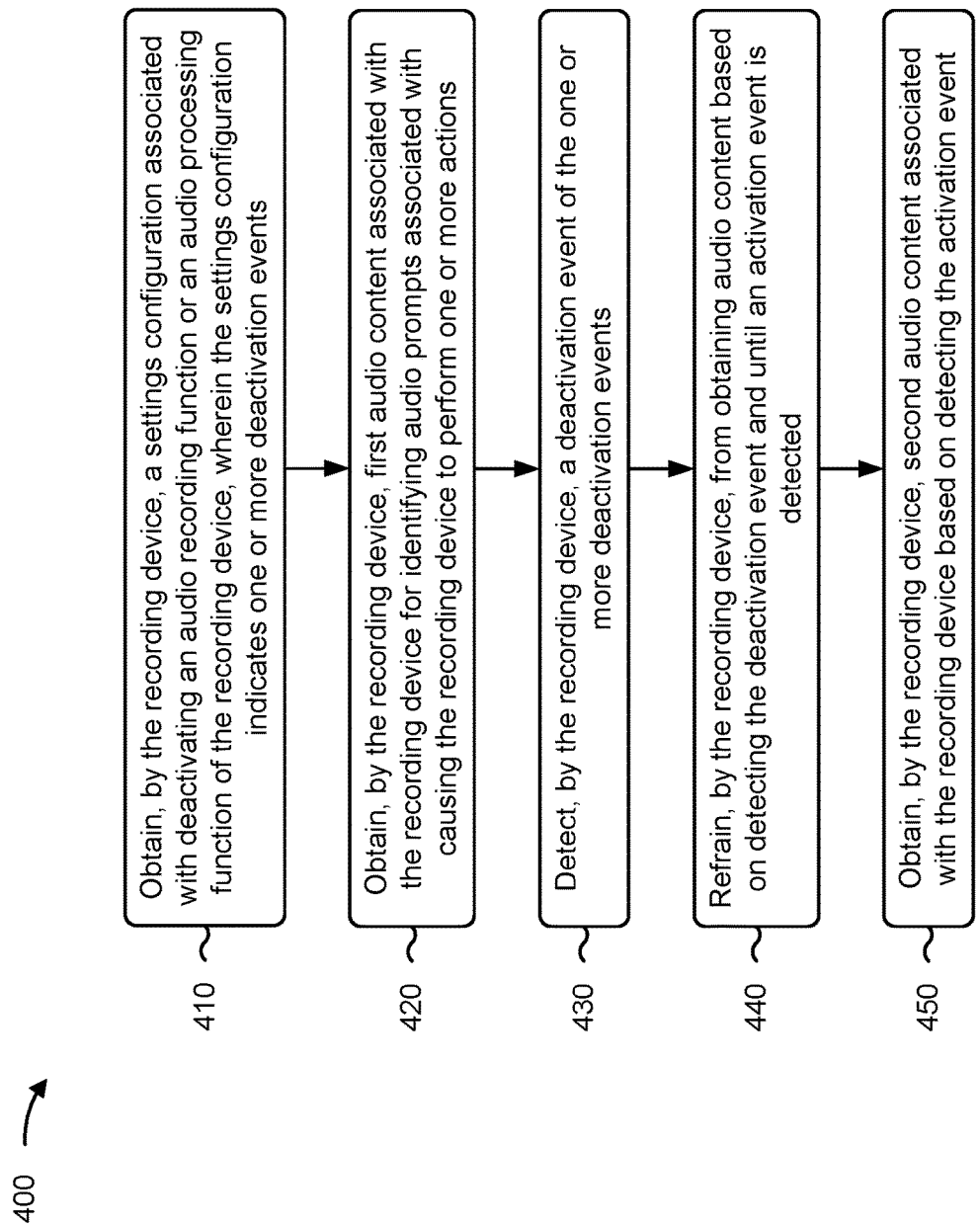
FIG. 4 is a flowchart of an example process associated with context-based deactivation of a recording device, in accordance with some embodiments of the present disclosure.

FIG. 4 is a flowchart of an example process 400 associated with context-based deactivation of a recording device. In some implementations, one or more process blocks of FIG. 4 may be performed by the recording device 210. In some implementations, one or more process blocks of FIG. 4 may be performed by another device or a group of devices separate from or including the recording device 210, such as the user device 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining a settings configuration associated with deactivating an audio recording function or an audio processing function of the recording device, wherein the settings configuration indicates one or more deactivation events (block 410). For example, the recording device 210 (e.g., using processor 320 and/or memory 330) may obtain a settings configuration associated with deactivating an audio recording function or an audio processing function of the recording device, wherein the settings configuration indicates one or more deactivation events, as described above in connection with reference number 105 of FIG. 1A. As an example, a user may provide settings to the recording device indicating events or conditions (e.g., one or more deactivation events) associated with the recording device refraining from obtaining audio content.

As further shown in FIG. 4, process 400 may include obtaining first audio content associated with the recording device for identifying audio prompts associated with causing the recording device to perform one or more actions (block 420). For example, the recording device 210 (e.g., using processor 320 and/or memory 330) may obtain first audio content associated with the recording device for identifying audio prompts associated with causing the recording device to perform one or more actions, as described above in connection with reference number 115 of FIG. 1B. As an example, the recording device may record, store, and/or process the first audio content listening for prompts or commands that trigger the recording device to perform an action.

As further shown in FIG. 4, process 400 may include detecting a deactivation event of the one or more deactivation events (block 430). For example, the recording device 210 (e.g., using processor 320 and/or memory 330) may detect a deactivation event of the one or more deactivation events, as described above in connection with reference number 125 of FIG. 1B. As an example, the recording device may detect that an event or condition that triggers the recording device to refrain from obtaining audio content is present. For example, the event or condition may be associated with activities by a user that typically include confidential or sensitive information being spoken by the user.

As further shown in FIG. 4, process 400 may include refraining from obtaining audio content based on detecting the deactivation event and until an activation event is detected (block 440). For example, the recording device 210 (e.g., using processor 320 and/or memory 330) may refrain from obtaining audio content based on detecting the deactivation event and until an activation event is detected, as described above in connection with reference number 140 of FIG. 1C. As an example, the recording device may refrain from recording, storing, and/or processing audio content based on detecting the deactivation event. In some implementations, the recording device may refrain from obtaining any audio content until the activation event is detected. For example, based on a context of a situation or a conversation, the recording device may be prompted to refrain from obtaining audio content during the situation or conversation.

As further shown in FIG. 4, process 400 may include obtaining second audio content associated with the recording device based on detecting the activation event (block 450). For example, the recording device 210 (e.g., using processor 320 and/or memory 330) may obtain second audio content associated with the recording device based on detecting the activation event, as described above in connection with reference number 160 of FIG. 1D. As an example, based on detecting the activation event (e.g., an amount of time after detecting the deactivation event or based on activity associated with another device) the recording device may resume obtaining audio content for the purposes of identifying audio prompts associated with causing the recording device to perform one or more actions.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for context-based deactivation of a recording device, the system comprising:
   one or more memories; and
   one or more processors, coupled to the one or more memories, configured to:
      obtain first audio content associated with the recording device for identifying audio prompts associated with causing the recording device to perform one or more actions;
      detect a deactivation event based on at least one of the first audio content, a current time, or a settings configuration associated with the recording device;
      refrain from obtaining audio content associated with the recording device based on detecting the deactivation event and until an activation event is detected, wherein refraining from obtaining audio content includes at least one of refraining from storing any audio content until the activation event is detected or refraining from processing any audio content until the activation event is detected; and
      obtain second audio content associated with the recording device based on detecting the activation event.

2. The system of claim 1, wherein the one or more processors are further configured to:
   obtain the settings configuration, wherein the settings configuration indicates at least one of:
      one or more deactivation events including the deactivation event,
      one or more time periods during which the recording device is to be deactivated,
      one or more keywords associated with the deactivation event, or
      one or more categories associated with the deactivation event.

3. The system of claim 1, wherein the one or more processors, to detect the deactivation event, are configured to:
   process, using a natural language processing (NLP) technique, the first audio content to identify one or more words or one or more phrases associated with the first audio content; and
   determine that the one or more words or the one or more phrases are associated with one or more keywords or one or more categories associated with the deactivation event.

4. The system of claim 1, wherein the one or more processors are further configured to:
   analyze audio activity associated with the recording device to determine a schedule associated with one or more time periods during which the recording device is to be deactivated; and
   wherein the one or more processors, to detect the deactivation event, are configured to:
      detect that the current time is included in the one or more time periods.

5. The system of claim 1, wherein the activation event is based at least in part on an amount of time from a time at which the deactivation event is detected.

6. The system of claim 5, wherein the amount of time is based on the deactivation event that is detected.

7. The system of claim 1, wherein the one or more processors are further configured to:
   provide an indication that the recording device is to resume obtaining audio content based on detecting the activation event and prior to obtaining the second audio content, wherein the indication includes at least one of:
      an audible indication, or
      a text notification.

8. The system of claim 1, wherein the recording device is associated with at least one of:
   an application executing on the recording device,
   a virtual assistant, or
   an intelligent personal assistant.

9. A method for context-based deactivation of a recording device, comprising:
   obtaining, by the recording device, a settings configuration associated with deactivating an audio recording function or an audio processing function of the recording device, wherein the settings configuration indicates one or more deactivation events;
   obtaining, by the recording device, first audio content associated with the recording device for identifying audio prompts associated with causing the recording device to perform one or more actions;
   detecting, by the recording device, a deactivation event of the one or more deactivation events;
   refraining, by the recording device, from obtaining audio content based on detecting the deactivation event and until an activation event is detected; and
   obtaining, by the recording device, second audio content associated with the recording device based on detecting the activation event.

10. The method of claim 9, wherein the settings configuration indicates at least one of:
    one or more time periods during which the recording device is to be deactivated,
    one or more keywords associated with the deactivation event, or
    one or more categories associated with the deactivation event.

11. The method of claim 9, wherein detecting the deactivation event comprises:

processing the first audio content to identify one or more words or one or more phrases associated with the first audio content; and determining that the one or more words or the one or more phrases are associated with one or more keywords or one or more categories associated with the deactivation event.

12. The method of claim 9, wherein detecting the deactivation event comprises:

obtaining an indication of an activity associated with a user device; and detecting the deactivation event based on the activity associated with the user device.

13. The method of claim 12, wherein the activation event is based on a change in the activity or on the activity terminating.

14. The method of claim 9, further comprising:

providing an indication that the recording device is to refrain from obtaining audio content based on detecting the deactivation event, wherein the indication includes at least one of:

an audible indication, or a text notification.

15. A non-transitory computer-readable medium storing a set of instructions, the set of instructions comprising:

one or more instructions that, when executed by one or more processors of a recording device, cause the recording device to:

obtain a settings configuration associated with deactivating an audio recording function or an audio processing function of the recording device, wherein the settings configuration indicates one or more deactivation events;

obtain first audio content associated with the recording device for identifying audio prompts associated with causing the recording device to perform one or more actions;

detect a deactivation event of the one or more deactivation events;

refrain from obtaining audio content based on detecting the deactivation event and until an activation event is detected;

detect the activation event, wherein the activation event is associated with the deactivation event; and obtain second audio content associated with the recording device based on detecting the activation event.

16. The non-transitory computer-readable medium of claim 15, wherein the one or more instructions, that cause the recording device to detect the activation event, cause the recording device to:

determine that an amount of time from detecting the deactivation event satisfies a threshold; and resume audio recording or audio processing based on determining that the amount of time from detecting the deactivation event satisfies the threshold.

17. The non-transitory computer-readable medium of claim 15, wherein the settings configuration indicates one or more categories of audio content that are to trigger a deactivation of the recording device, and wherein the one or more instructions, that cause the recording device to detect the deactivation event, cause the recording device to:

detect, via a machine learning model that is trained to detect the one or more categories of audio content, that the first audio content is associated with at least one category of the one or more categories of audio content.

18. The non-transitory computer-readable medium of claim 15, wherein the one or more instructions, that cause the recording device to detect the activation event, cause the recording device to:

detect activity associated with another recording device that is associated with the recording device, wherein the activation event is associated with the activity.

19. The non-transitory computer-readable medium of claim 15, wherein the one or more instructions, when executed by the one or more processors, further cause the recording device to:

provide an indication that the recording device is to begin refraining from obtaining audio content based on detecting the deactivation event.

20. The non-transitory computer-readable medium of claim 15, wherein the recording device includes a virtual assistant application executing on the recording device, and wherein the virtual assistant application is associated with the audio recording function or the audio processing function of the recording device.

* * * * *